May 11, 1943.　　　　B. DELAND　　　　2,318,676
DISPENSING DEVICE
Filed Oct. 24, 1941　　　　2 Sheets-Sheet 1

INVENTOR.
Benjamin Deland.

May 11, 1943.  B. DELAND  2,318,676
DISPENSING DEVICE
Filed Oct. 24, 1941  2 Sheets-Sheet 2

INVENTOR.
Benjamin Deland

Patented May 11, 1943

2,318,676

UNITED STATES PATENT OFFICE 2,318,676

DISPENSING DEVICE

Benjamin Deland, Cleveland, Ohio

Application October 24, 1941, Serial No. 416,363

1 Claim. (Cl. 221—114)

This invention relates to new and useful improvements in dispensing devices, and particularly to that class of devices of this character which are designed to measure an equal amount of material by volume, each time the measuring means is actuated.

An object of my invention is to provide a device of the character indicated which can be cheaply produced and which will be serviceable in operation and durable in use.

With this object in view and with the intention of securing other advantages which will hereinafter appear, my invention consists of the features of construction, and combination of parts described in the specification, particularly pointed out in the claim and illustrated in the accompanying drawings.

Figure 1:
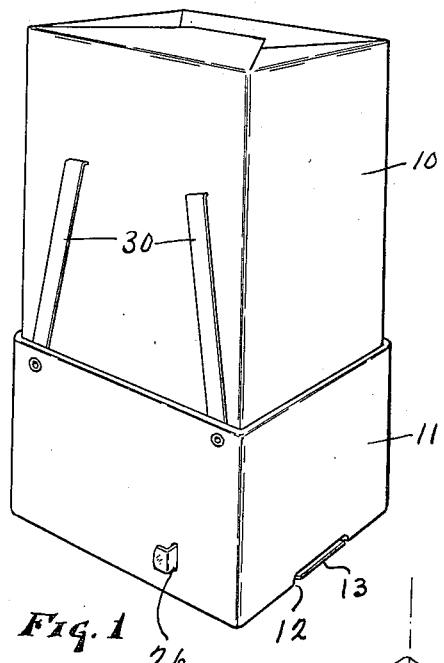
Figure 2:
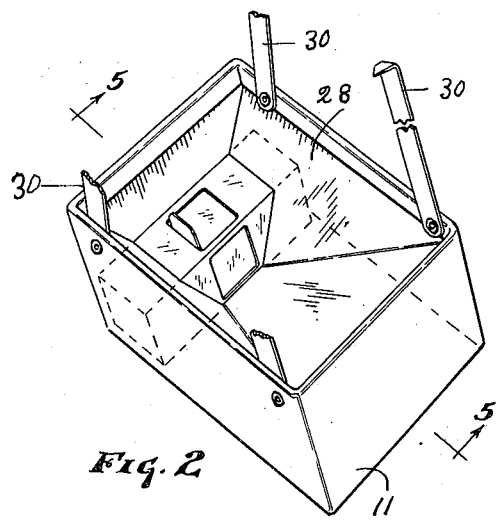
Figure 3:
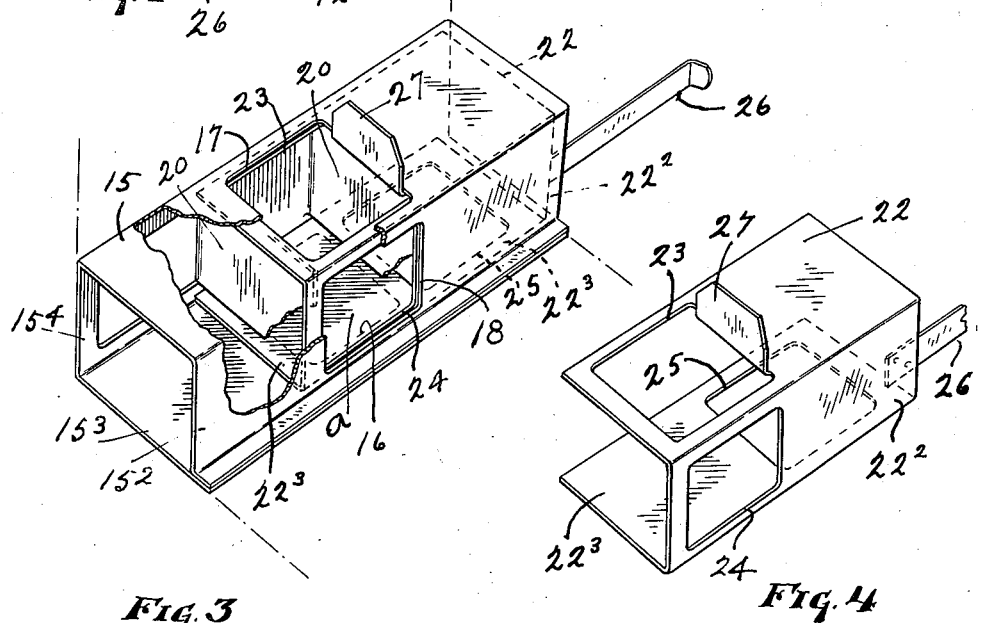
Figure 4:
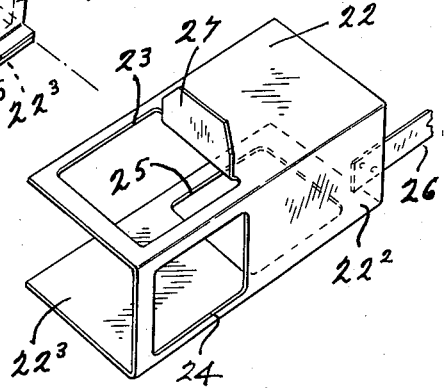
Figure 5:
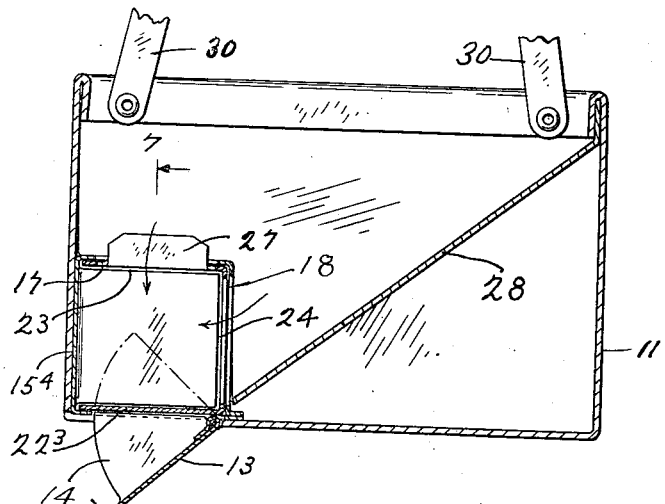
Figure 6:
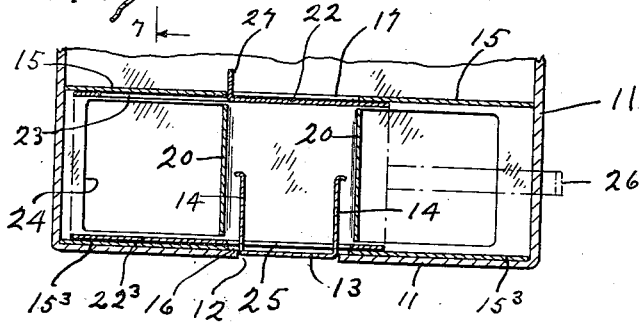
Figure 7:
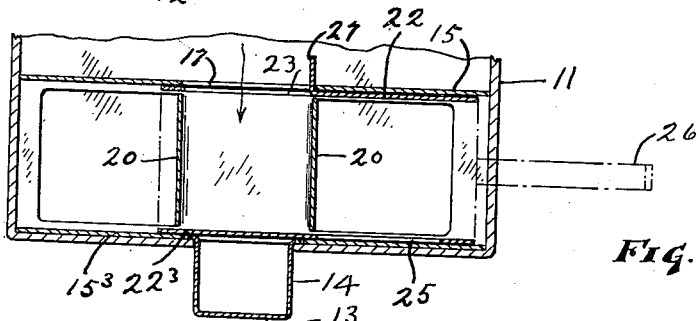
Figure 8:
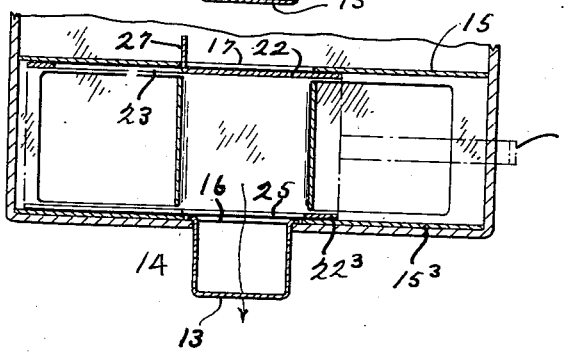

Referring to the accompanying drawings, Fig. 1 is a perspective view of a container embodying my invention. Fig. 2 is a perspective view of the lower portion or base of the container. Fig. 3 is a perspective view of the dispensing means. Fig. 4 is a perspective view of the movable member or valve of the dispensing means. Fig. 5 is a vertical, longitudinal sectional view of the base of the container and the dispensing means, with the valve in position for admitting material into the measuring chamber. Fig. 6 is a transverse sectional view of same showing the valve in position to close the measuring chamber against the admission of the material in the container. Fig. 7 is a section on line 7—7, Fig. 5. Fig. 8 is a similar view but with the valve shifted to permit the material to leave or be dispensed from the measuring chamber.

My dispensing device is primarily designed for domestic use, to measure small quantities of material such as coffee, tea, sugar and the like, which are generally specified by quantity, as tea-spoonful, table-spoonful and similar quantity measurement. The individual quantity of material which the dispenser will measure off will therefore be governed by the type or class of material which the container is designed to hold.

In the embodiment of my invention, as illustrated in the accompanying drawings, I provide a container 10, adapted to store a quantity of material, which is to be measured off from time to time for use. This container may be of any shape in cross section and as shown it is rectangular.

The container as shown has a removable base 11, and in the bottom thereof and preferably at the center near the front is formed a delivery opening 12. A plate 13 is hinged at the underside of the bottom of the base and when swung up against the bottom forms a closure member for the opening 12 to provide an air seal. When the plate 13 is swung down it provides a spout for directing the flow of the material as it leaves the container.

The plate 13 has upstanding sides or flanges 14, which not only complete the spout formation but also provide means for locking the dispensing means against accidental operation, as will be more fully explained later.

In the front part of the base is mounted the dispensing means which comprises a casing, rectangular in cross section, which includes a measuring chamber and a sleeve valve freely slidable in said casing. The casing comprises a top plate or member 15, an inner side plate $15^2$, a bottom plate $15^3$, and an outer plate $15^4$. The outer plate $15^4$ abuts against the front wall of the base. This casing forms a box-like structure from which the material in the casing is excluded except by passing through the openings or ports described in the next paragraph.

In the bottom plate $15^3$ is formed an opening 16, which permanently registers with the port 13, in the bottom of the base and may be called the outlet port of the dispenser. In the top plate 15, directly above the port 16 is formed an opening 17 and in the inner plate $15^2$ is formed an opening 18, which may be considered a continuation of the opening 17, and the openings 17 and 18 together may be termed the inlet port of the casing.

The material of the outer plate $15^4$ is cut and turned back into the casing forming walls or partitions which include the aforementioned ports, as shown at 20, and together with the included portion of the casing form a measuring chamber $a$, the inlet and outlet of which are the aforementioned ports.

Within the casing is a sleeve valve arranged to slide longitudinally of the casing. This valve comprises a top plate 22, an inner side plate $22^2$ and a bottom plate $22^3$. In the top and side plates are formed openings 23 and 24, respectively, which together may be termed the inlet port of the valve. In the bottom plate is formed an opening 25 which may be termed the outlet port of the valve; but the outlet port 25 is not in line with the inlet port, it being spaced forwardly a distance slightly greater than the width of said ports.

The valve is provided with an operating rod or stem 26, the free end of which extends through a side wall of the base so that it may be engaged to move the valve back and forth in the casing.

On the top plate 22 of the valve is arranged an upstanding flange 27 which forms an agitator or rake to assist the flow of the material in the container into the measuring chamber of the dispenser.

A false bottom 28 having inclined surfaces for directing the material in the container to the ports of the casing may be placed in the base.

The base may be secured to the body of the container in any suitable manner, such as by the spring clips, shown at 30.

The general operation of the dispensing mechanism is as follows: When the valve is in the closed position, as shown in Fig. 6, then the valve will be in its innermost position and the outlet 25 thereof will be in registration with the outlet 16 of the casing. The imperforate portions of the valve will cover and close the inlet of the casing. The spout 13 will be in its swung up position and the flanges thereon will extend up through the outlet opening 25 of the valve, thereby locking the valve against movement. In this position of the valve the measuring chamber will be empty.

Now if it is desired to dispense the material in the container, it is first necessary to fill the measuring chamber. To do this the valve stem is pulled out, after first freeing the valve by swinging down the spout. The outward movement of the valve stem will bring the inlet port of the valve into registration with the inlet port of the casing and the imperforate portion of the bottom plate of the valve into position to cover the outlet 16 of the casing, as shown in Fig. 7.

The material will then flow through the registering inlet ports of the casing and valve and fill the measuring chamber.

To dispense the contents of the measuring chamber, the valve stem is shoved back quickly, thereby bringing the outlet port of the valve into registration with the outlet port of the casing and the imperforate portion of the valve in position to cover and close the inlet port of the casing. The material will then flow from the measuring chamber.

Thereafter each time the valve stem is pulled out the measuring chamber will be filled and each time the stem is shoved back, the measuring chamber will be emptied.

What I claim is:

In a dispensing device, the combination of a container having a delivery opening in the bottom thereof, a casing arranged in said container over said opening in the bottom of the container, a measuring chamber formed in said casing, said measuring chamber having an inlet port communicating with the interior of the container, a valve slidable through the measuring chamber and having inlet and outlet ports adapted to register with the inlet and outlet ports of the casing, respectively, as the valve is shifted from one operative position to the other operative position, a plate hinged to the underside of the bottom of the container and arranged to close the delivery opening in the bottom of the container when swung up against the bottom of the container and form a delivery chute when swung down, said plate carrying means adapted to engage the valve when the plate is swung up and lock the valve against movement.

BENJAMIN DELAND.